United States Patent [19]

Bergles

[11] Patent Number: 4,460,347

[45] Date of Patent: * Jul. 17, 1984

[54] MECHANISM FOR ADJUSTING THE POSITION OF A BICYCLE CHAIN

[75] Inventor: Eduard Bergles, Graz, Austria

[73] Assignee: Fichtel & Sachs AG

[*] Notice: The portion of the term of this patent subsequent to Nov. 4, 1997 has been disclaimed.

[21] Appl. No.: 199,478

[22] Filed: Oct. 22, 1980

[30] Foreign Application Priority Data

Oct. 26, 1979 [DE] Fed. Rep. of Germany ... 7930350[U]

[51] Int. Cl.³ .......................... F16H 9/00; F16H 11/00
[52] U.S. Cl. ........................................ 474/82; 474/80
[58] Field of Search ....................... 474/78, 79, 80, 81, 474/82

[56] References Cited

U.S. PATENT DOCUMENTS

| | | | |
|---|---|---|---|
| 3,927,904 | 12/1975 | Bergles | 474/82 |
| 4,002,080 | 1/1977 | Huret et al. | 474/82 |
| 4,027,542 | 6/1977 | Nagano | 474/82 |
| 4,030,374 | 6/1977 | Isobe | 474/82 |
| 4,030,375 | 6/1977 | Nagano | 474/82 |
| 4,231,264 | 11/1980 | Bergles | 474/80 |
| 4,305,711 | 12/1981 | Lannoch | 474/82 |

FOREIGN PATENT DOCUMENTS

| | | |
|---|---|---|
| 7626944 | 7/1982 | Fed. Rep. of Germany . |
| 2003561 | 7/1982 | United Kingdom . |
| 1528977 | 7/1982 | United Kingdom . |

Primary Examiner—Lawrence J. Staab
Assistant Examiner—Michael D. Bednarek
Attorney, Agent, or Firm—Toren, McGeady and Stanger

[57] ABSTRACT

A linkage system is provided on a bicycle for displacing a bicycle chain between chain wheels mounted on a common axis. The linkage system includes a first linkage head fixed to a support attached to the bicycle frame and a movably positionable second linkage head connected to a device for moving the chain. An articulated lever and a guide member are connected together by a pivot joint intermediate their ends with the ends of the lever and guide member being pivotally connected to the two linkage heads. The joints connecting the lever to the linkage heads permit the lever to effect a sliding movement not available to the guide member. A mechanism for deforming the linkage system is connected to the pivot which mounts the guide member on the first linkage head.

27 Claims, 7 Drawing Figures

MECHANISM FOR ADJUSTING THE POSITION OF A BICYCLE CHAIN

SUMMARY OF THE INVENTION

The present invention is directed to a mechanism for adjusting a device for displacing a bicycle chain between chain wheels. The bicycle chain extends from a foot pedal drive to the rear wheel of the bicycle and the chain can be selectively positioned on one of a number of chain wheels concentrically mounted on the axis of the foot pedal drive. The chain wheels have different numbers of teeth. The mechanism for adjusting the bicycle chain includes a support fixed to the bicycle frame. A first head is fixed to the support while a movable second head is connected to the device for moving the bicycle chain. The second head is movable approximately parallel to the axis of the foot pedal drive. A linkage system interconnects the first and second heads. The linkage system including the first and second heads is deformable in a plane substantially parallel to the foot pedal axis. An activating mechanism is connected to the linkage system for deforming it as required for moving the bicycle chain.

Such an adjusting mechanism is known from the German Utility Model No. 7,626,944 of Jan. 13, 1977. In the known mechanism, a linkage system consists of two articulated levers disposed parallel to one another which, together with the joint heads, form a parallelogram. The practical embodiment of this structural arrangement leads to a very complicated construction in which the structural components are exposed to contact, dirt and damage.

It is the primary object of the present invention to provide an adjusting mechanism of the type described above so that a simple construction with few individual parts and a closed arrangement is afforded. In the mechanism embodying the present invention sensitive structural components are protected to a great extent against any outside influences.

In accordance with the present invention the linkage system including the first and second linkage heads includes an articulated lever secured to the first linkage head by a first joint and to the movable second linkage head by a second joint. A guide member is connected by a third joint to the first linkage head and by a fourth joint to the movable second linkage head. A fifth joint pivotally connects the articulated lever and the guide member. The axes of the joints extend substantially perpendicularly to the plane of adjustment and two of the joints afford a sliding action in addition to a pivotal action so that a relative displacement in the plane of adjustment can be effected by the parts forming the linkage system.

In the adjusting mechanism embodied in the present invention, there are few individual parts and an arrangement is afforded which has an attractive shape and requires little space. The mechanism operates reliably, it is easily installed and maintained, and can be especially easily adjusted.

There are additional features of the invention hereinafter described which relate to additional simplification of the mechanism with a decrease in the space required and with protection for the sensitive parts of the mechanism.

The various features of novelty which characterize the invention are pointed out with particularity in the claims annexed to and forming a part of this disclosure.

For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
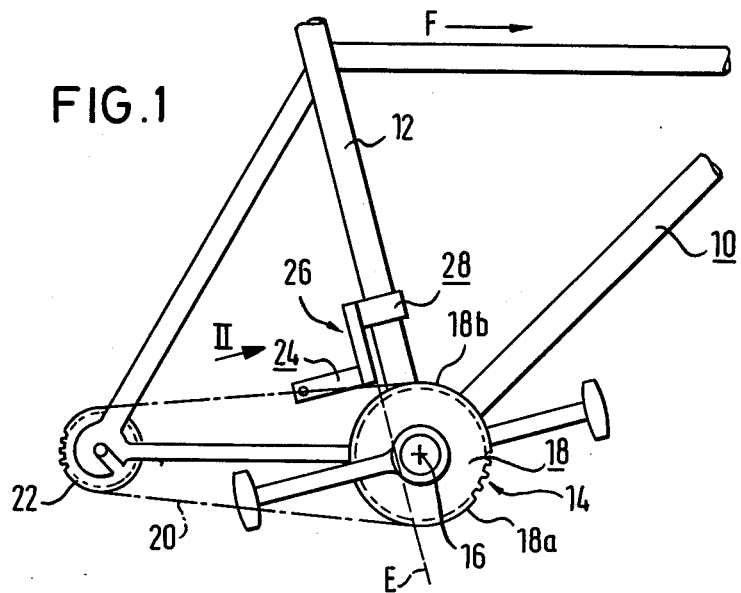
FIG. 1 is a diagrammatic sketch of a portion of a bicycle frame illustrating an adjusting mechanism for displacing a bicycle chain.

In FIG. 1 a portion of a bicycle frame 10 is illustrated. Bicycle frame 10 includes a saddle tube 12 with a foot pedal drive 14 at the lower end of the saddle tube. Foot pedal drive 14 has an axle 16 with a pair of chain wheels 18 concentrically mounted on the axis. From the chain wheels 18 of the foot pedal drive 14, a chain 20 extends around chain wheels 22 connected to a rear wheel, not shown, of the bicycle. It is of no importance with respect to the present invention whether one or a number of chain wheels 22 are mounted on the rear wheel. If several chain wheels 22 are used, then the chain can be switched back and forth between these wheels by a switching device such as disclosed in U.S. Pat. No. 4,231,264.

The present invention is directed to displacing the chain 20 between different chain wheels 18, especially two different chain wheels 18a, 18b which have a different number of teeth and, therefore, effect a different speed ratio from the foot pedal drive 14 to the rear wheel.

To switch the chain 20 between the two chain wheels 18a, 18b, a chain throw-out device 24 is provided and, as viewed in FIG. 1, the device is adjustable perpendicularly to the drawing plane, that is, parallel to the foot pedal axis 16, for transferring the chain 20 between the chain wheels 18a, 18b. The chain throw-out device 24 is described in more detail below. The device 24 is mounted on an adjusting mechanism 26 positioned on a support 28 fixed to the bicycle frame. Support 28 is attached to the saddle tube 12 above the foot pedal drive 14, note FIG. 1.

The driving direction of the bicycle is indicated by F in FIG. 1.

Figure 2:
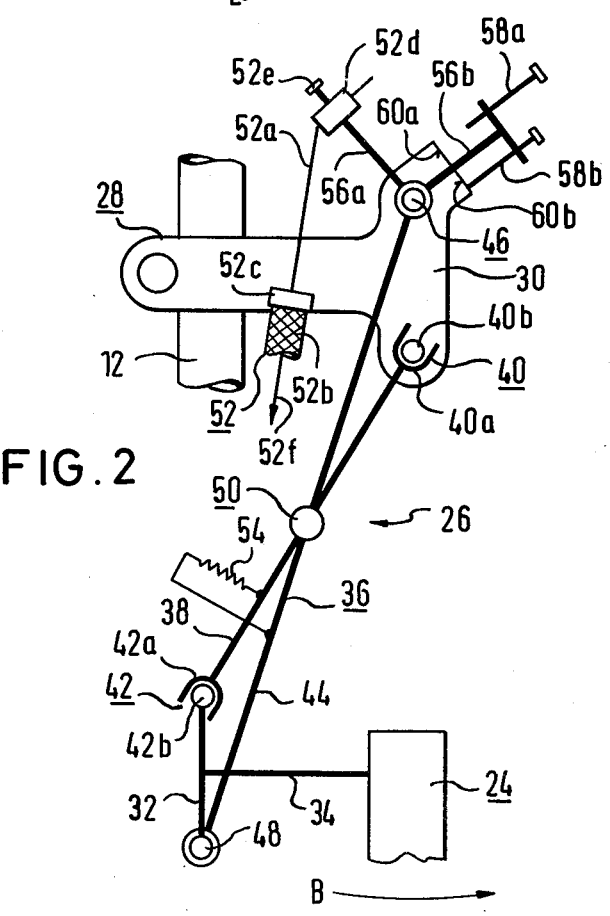
FIG. 2 is a schematic view of the adjusting mechanism in FIG. 1 taken in the direction of the arrow II.

Adjusting mechanism 26 is shown schematically in FIG. 2. A linkage head 30 is formed as an integral part of the support 28. The chain throw-out device 24 is connected with a movable linkage head 32 by means of a rigid connecting element 34. A linkage system 36 interconnects linkage head 30 with linkage head 32. Linkage system 36 includes an articulated lever 38 connected to the linkage head 30, integral with the support, by a first joint 40 formed as a sliding joint. At its other end the lever 38 is connected by a second joint 42, also a sliding joint, to the movable linkage head 32. Further, the linkage system 36 includes a guide member 44 connected to the linkage head 30 formed with the support by a third joint 46 while a fourth joint 48 secures the guide member to the movable linkage head 32. In addition, a fifth joint 50 connects the articulated lever 38 and the guide member 44. Fifth joint 50 is equidistantly spaced between the first joint 40 and the second joint 42 and is also equidistantly spaced between the third joint 46 and the fourth joint 48. As is shown in FIG. 2, the distance between the fifth joint 50 and the first and second joints 40, 42 is smaller than the distance between the fifth joint and the third and fourth joints 46, 48.

Sliding joint 40 is formed by an oblong hole 40a in the articulated lever 38 and by a pivot pin 40b fixed to the linkage head 30 forming part of the support 28. Similarly, the second sliding joint 42 is formed by an oblong hole 42a in the opposite end of the articulated lever 38 and by a pivot pin 42b on the movable linkage head 32. With the first and second joints 40, 42 forming sliding joints, it is possible to deform the five joint system shown in FIG. 2 in the plane of that figure with the movable linkage head 32 and the attached chain throw-out device 24 moving along a path B in the plane of FIG. 2 which is essentially perpendicular to the plane of FIG. 1. As viewed in FIG. 2, the chain throw-out device 24 is in the position corresponding to the larger chain wheel 18a. By a displacement in the direction of the arrow B in FIG. 2, the chain throw-out device 24 can be displaced into the position in which the chain engages the smaller chain wheel 18b.

To adjust or displace the linkage system 36, a Bowden wire 52 is provided having a traction rope 52a and an enclosing hose 52b. The end of hose 52b bears against an abutment 52c fixed on the support 28 and the traction rope 52a is attached to an anchor 52d by a clamping screw 52e and the anchor 52d is firmly connected to one end of the guide member 44. By pulling the traction rope 52a in the direction of the arrow 52f in FIG. 2, the movable linkage head 32 is displaced from the end position shown in FIG. 2 in the direction of the arrow B. A return spring 54 is connected between the articulated lever 38 and the guide member 44 and biases the linkage system 36 into the end position shown in FIG. 2.

As can be seen in FIG. 2, at the third joint 46, the end of the guide member 44 is bifurcated into two angularly disposed ends 56a, 56b. Anchor 52d is attached to the end 56a. A pair of adjusting screws 58a, 58b are mounted on the other end 56b. In the end position illustrated in FIG. 2, adjusting screw 58b contacts stop surface 60b on the linkage head 30. The end position shown in FIG. 2 is determined by the engagement of the adjusting screw 58b with the stop surface 60b under the biasing action of the return spring 54. When the linkage system 36 is moved by the traction rope 52a in the direction of the arrow B in FIG. 2, then the adjusting screw 58b is displaced from the stop surface 60b and the adjusting screw 58a moves into contact with the stop surface 60a defining the second end position of the linkage system. The construction of the adjusting mechanism 26 is displayed in detail in FIGS. 3 to 7. As can be noted in FIG. 4, the articulated lever 38 is located between guide member 44 on one side and the linkage heads 30, 32 on the other side in the form of a sandwich. It can be seen in FIG. 4 that the pivot pin 42b is formed from the joint head 32 by means of embossing. Similarly, pivot pin 40b is formed as an integral part of the linkage head 30. Articulated lever 38 is formed as a part with parallel surfaces and with oblong holes 40a and 42a, however, only oblong hole 42a can be seen in FIG. 4. In addition, in the parallel sided part or articulated lever 38, a bore 50a is provided into which a pin 50b formed on the guide portion 44 fits forming the fifth joint 50. In the guide member 44 an annular recess 44a is located around the pin 50b and the return spring 54 is held in the recess. Spring 54 is a torsion spring. As can be seen in the drawing, return spring 54 is completely enclosed by the articulated lever 38 and the guide member 44.

Figure 4:
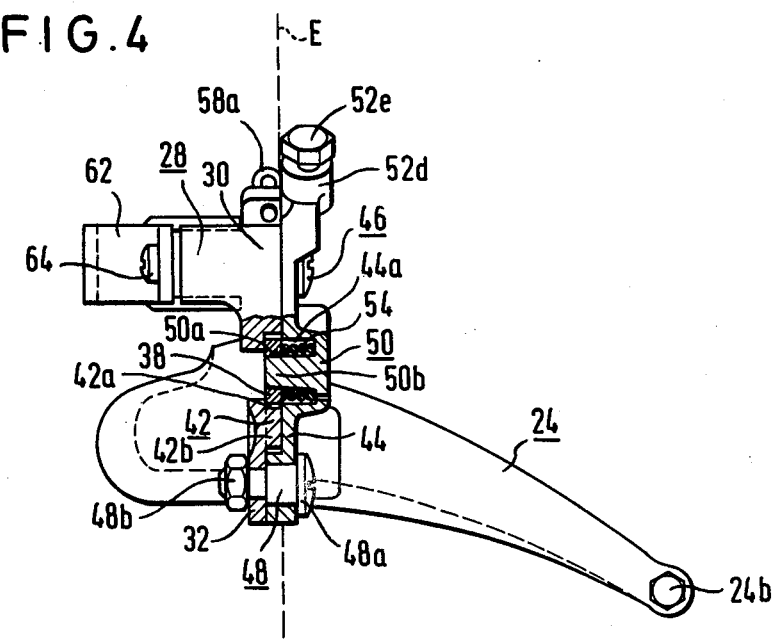
FIG. 4 is a side view, partly in section, taken along the line IV—IV in FIG. 3.

In FIG. 4 it can also be seen that the fourth joint 48 pivotally connecting guide member 44 to movable linkage head 32 is formed by a collar bolt 48a and lock nut 48b. The collar bolt 48a and lock nut 48b are arranged to provide a spacing on the bolt corresponding to the thickness of the articulated lever 38. Third joint 46 is formed in a similar manner by a collar bolt and a lock nut. Consequently, guide member 44, articulated lever 38 and the linkage heads 30, 32 are held together in the correct operating position by the two collar bolts and accompanying lock nuts.

Figure 5:
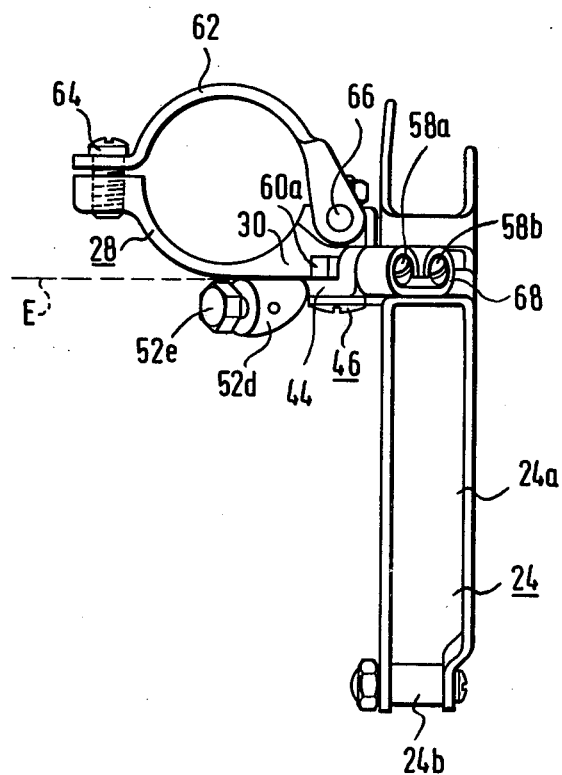
FIG. 5 is a plan view taken in the direction of the arrow V in FIG. 3.
Figure 6:
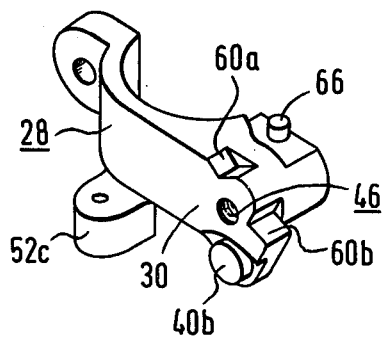
FIG. 6 is a perspective view of the linkage head which is fixed to a support.

As can be seen best in FIG. 5, the combination of support 28 and pipe saddle 62 secured together by a tightening screw 64 form a clamp securing the support to the saddle tube 12 of the bicycle frame. Pipe saddle 62 is arranged to pivot about a joint stud 66 on the support 28.

Figure 3:
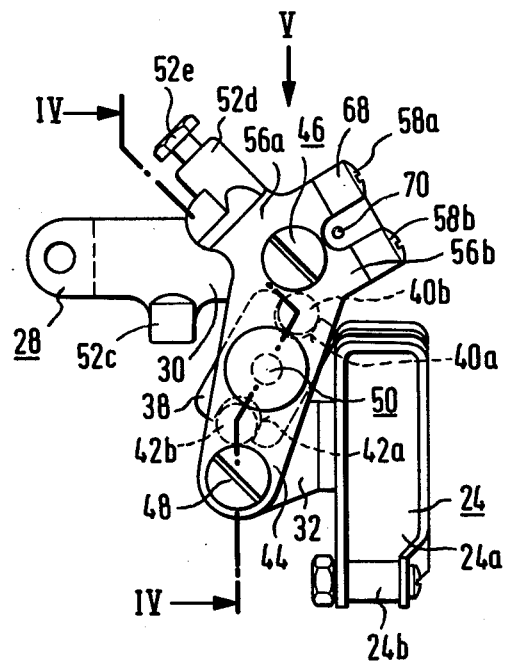
FIG. 3 is an elevational view of the adjusting mechanism shown schematically in FIG. 2.
Figure 7:
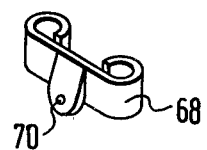
FIG. 7 is a perspective view of a part of the adjusting mechanism which provides a stop for adjusting screws.

As shown in FIG. 3, adjusting screws 58a, 58b are enclosed by a band-shaped elastic part 68, note FIG. 7, with the part having two rolled ends surrounding the adjusting screws 58a, 58b with a certain friction to prevent any unintentional self-adjustment of the adjusting screws. Band-shaped part 68 is releasably connected to the guide member 44 by a plug connection 70. Plug connection 70 can be formed by a bolt and a hole with one of these parts, that is the bolt or the hole, located in the part 68 and the other in the guide member 44.

In FIGS. 4 and 5 the approximate shape of the chain throw-out device 24 can be noted, the device encloses the chain by its opening 24a and includes a chain guidance roll 24b.

As is evident in FIG. 3, the bifurcated ends 56a, 56b define an angle of about 90° around the third joint 46. In FIGS. 2 and 3 it can be seen that the two adjusting screws 58a, 58b face away from the bicycle frame so that they are more easily accessible using an adjusting tool. Clamping screw 52e is also adjustable by a tool.

In FIG. 2 the articulated lever 38 and the guide portion 44 of the linkage system extend substantially parallel to the saddle tube 12 and this arrangement is particularly important as a space saving embodiment.

By adjusting the screws 58a, 58b, the location of the chain throw-out device 24 in the end positions of the linkage system 36 can be adjusted to the position of the individual chain wheels 18a, 18b.

In the selected arrangement of the joints 40, 42, 46, 48, 50, the movement of the chain throw-out device 24 is approximately linear in the direction of arrow B in FIG. 2 and, therefore, perpendicular to the drawing plane of FIG. 1. It is also possible to modify the movement of the chain throw-out device with intentional changes of the joints so that a swivel motion is superimposed on the linear motion of the chain throw-out device.

While specific embodiments of the invention have been shown and described in detail to illustrate the application of the inventive principles, it will be understood that the invention may be embodied otherwise without departing from such principles.

What is claimed is:

1. Mechanism for adjusting the position of a bicycle chain on a bicycle comprising a bicycle frame, a foot pedal drive having a foot pedal axis mounted on said bicycle frame, at least two chain wheels including a first chain wheel and a second chain wheel concentrically mounted on the foot pedal axis, a support fixed to said frame adjacent said foot pedal drive, a device for moving a bicycle chain between the first and second chain wheels, a linkage system connected between said support and said device, means connected to said linkage system for deforming said linkage system, said linkage system being deformable in a plane substantially parallel to the foot pedal axis and comprising a first linkage head fixed to said support, a movable second linkage head spaced from said first linkage head and connected to said device, said second linkage head being movable approximately parallel to the foot pedal axis, an articulated lever having a first end and a second end with a first pivot joint connecting said first end to said first linkage head and a second pivot joint connecting said second end to said second linkage head, a guide member having a first end and a second end, a third pivot joint connecting said guide member to said first linkage head, a fourth pivot joint connecting said guide member to said second linkage head, a fifth joint pivotally connecting said articulated lever to said guide member, each of said first, second, third, fourth and fifth joints having an axis in spaced relation to one another and disposed substantially perpendicular to the plane of deformation of said linkage system, two of said joints being sliding joints affording linear displacement in the plane of deformation, stop means for limiting the displacement of said linkage system between two end positions in the plane of deformation thereof, said stop means comprises a pair of adjusting screws mounted on said guide member and a pair of stop surfaces formed on said first linkage head with each of said adjusting screws being arranged to interact with a different one of said stop surfaces, said adjusting screws have their axes approximately parallel to one another and parallel to the plane of deformation of said linkage system, each of said adjusting screws having a tool engagement surface thereon with said tool engagement surface facing upwardly in the normal erect position of the bicycle, said adjusting screws are located laterally of the plane of said bicycle frame and the tool engagement surfaces thereof face away from the plane of said bicycle frame, a band-shaped elastic part encloses said adjusting screws with the ends of said band-shaped part being rolled for elastically enclosing said adjusting screws, and a plug connection for securing the portion of said band-shaped part between the rolled ends thereof to said guide member.

2. Mechanism for adjusting the position of a bicycle chain, on a bicycle comprising a bicycle frame, a foot pedal drive having a foot pedal axis mounted on said bicycle frame, at least two chain wheels including a first chain wheel and a second chain wheel concentrically mounted on the foot pedal axis, a support fixed to said frame adjacent said foot pedal drive, a device for moving a bicycle chain between the first and second chain wheels, a linkage system connected between said support and said device, means connected to said linkage system for deforming said linkage system, said linkage system being deformable in a plane substantially parallel to the foot pedal axis and comprising a first linkage head fixed to said support, a movable second linkage head spaced from said first linkage head and connected to said device, said second linkage head being movable approximately parallel to the foot pedal axis, an articulated lever having a first end and a second end with a first pivot joint connecting said first end to said first linkage head and a second pivot joint connecting said second end to said second linkage head, a guide member having a first end and a second end, a third pivot joint connecting said guide member to said first linkage head, a fourth pivot joint connecting said guide member to said second linkage head, a fifth joint pivotally connecting said articulated lever to said guide member, each of said first, second, third, fourth and fifth joints having an axis in spaced relation to one another and disposed substantially perpendicular to the plane of deformation of said linkage system, two of said joints being sliding joints affording linear displacement in the plane of deformation, said means for deforming said linkage system being connected to said third joint, said means for deforming said linkage system includes a traction rope, said traction rope is connected to said guide member, the first end of said guide member at said third joint being bifurcated and forming a first bifurcated end and a second bifurcated end, adjusting screws mounted on said second bifurcated end, and a clamping screw securing said traction rope to said first bifurcated end.

3. Mechanism, as set forth in claim 1 or 3, wherein said fifth joint is located intermediate said first and second joints and intermediate said third and fourth joints.

4. Mechanism, as set forth in claim 3, wherein the distance of said fifth joint from said first joint and said second joint is smaller than the distance of said fifth joint from said third joint and said fourth joint.

5. Mechanism, as set forth in claim 1 or 2, wherein said sliding joints are formed by said first and second joints, and said first and second joints comprising oblong holes in said articulated lever and a pin secured to said first linkage head and a pin secured to said second linkage head.

6. Mechanism, as set forth in claim 1 or 3, wherein said first linkage head being formed integrally with said support.

7. Mechanism, as set forth in claim 6, including a pipe saddle, said pipe saddle being connected to said support and forming, in combination with said support, an enclosing ring for mounting on said bicycle frame.

8. Mechanism, as set forth in claim 1 or 2, wherein said bicycle frame includes a saddle tube with said foot pedal drive located at the lower end of said saddle tube, and the plane of deformation of said linkage system being substantially parallel to said saddle tube.

9. Mechanism, as set forth in claim 8, wherein the plane of deformation of said linkage system, as viewed in the driving direction of the bicycle, is located immediately rearwardly of said saddle tube.

10. Mechanism, as set forth in claim 8, wherein said guide member extends substantially parallel to said saddle tube and the first end of said guide member being its upper end and the second end of said guide member being its lower end.

11. Mechanism, as set forth in claim 2, including stop means for limiting the displacement of said linkage system between two end portions in the plane of deformation thereof.

12. Mechanism, as set forth in claim 11, wherein said stop means comprises a pair of adjusting screws mounted on said guide member and a pair of stop surfaces formed on said first linkage head with each of said adjusting screws being arranged to interact with a different one of said stop surfaces.

13. Mechanism, as set forth in claim 12, wherein said adjusting screws have their axes approximately parallel to one another and parallel to the plane of deformation of said linkage system.

14. Mechanism, as set forth in claim 13, wherein each of said adjusting screws having a tool engagement surface thereon with said tool engagement surface facing upwardly in the normal erect position of the bicycle.

15. Mechanism, as set forth in claim 14, wherein said adjusting screws are located laterally of the plane of said bicycle frame and the tool engagement surfaces thereon face away from the plane of said bicycle frame.

16. Mechanism, as set forth in claim 15, wherein a band-shaped elastic part encloses said adjusting screws with the ends of said band-shaped part being rolled for elastically enclosing said adjusting screws.

17. Mechanism, as set forth in claim 1, wherein said means for deforming said linkage system includes a traction pipe.

18. Mechanism, as set forth in claim 17, wherein said traction rope is connected to said guide member.

19. Mechanism, as set forth in claim 1 or 2, wherein said means for deforming said linkage system comprises a Bowden wire, said Bowden wire includes a hose laterally enclosing said traction rope, said hose being disposed at its end in bearing contact with one of said support or said first linkage head.

20. Mechanism, as set forth in claim 1 or 2, wherein a return spring extends around said fifth joint encircling the joint axis thereof, said return spring being a torsion spring in engagement at one end with said articulated lever and at the other end with said guide member.

21. Mechanism, as set forth in claim 20, wherein said guide member and said articulated lever completely enclosing said return spring.

22. Mechanism, as set forth in claim 21, wherein said fifth joint comprises a pin formed on said guide member and a bore formed in said articulated lever, each of said guide member and articulated lever having a contact surface in bearing contact with the other and disposed in parallel relation with the plane of deformation of said linkage system, said contact surfaces surrounding said pin and said bore and said contact surface of said guide member in the region of said pin having an annular space for receiving said return spring.

23. Mechanism, as set forth in claim 22, wherein said articulated lever being a part having parallel planar surfaces and having the bore for said fifth joint and the oblong holes for said first and second joints therein and said parallel surfaces of said part disposed between a contact surface of said guide member on one side and surfaces on said first and second linkage heads on the other side so that said articulated lever is enclosed in a sandwich-like manner.

24. Mechanism, as set forth in claim 23, wherein said pins on said guide member forming said third, fourth and fifth joints being cast on said guide member.

25. Mechanism, as set forth in claim 23, wherein said pins on said guide member forming said third, fourth, and fifth joints being embossed on said guide member.

26. Mechanism, as set forth in claim 23, wherein collar bolts space said guide member from said first and second linkage heads at said third joint and said fourth joint.

27. Mechanism, as set forth in claim 1, wherein said means for deforming said linkage system being connected to said third joint.

* * * * *